United States Patent

[11] 3,522,848

| [72] | Inventor: | Robert V. New |
| | | 2501 Cedar Springs Road, Dallas, Texas 75201 |
| [21] | Application No.: | 641,823 |
| [22] | Filed: | May 29, 1967 |
| [45] | Patented: | Aug. 4, 1970 |

[54] APPARATUS FOR PRODUCTION AMPLIFICATION BY STIMULATED EMISSION OF RADIATION
6 Claims, 2 Drawing Figs.

[52] U.S. Cl. .................................................. 166/60, 166/303
[51] Int. Cl. .................................................. E21b 43/24
[50] Field of Search .................................... 166/11, 39, 40, 57, 60, 177; 175/16; 219/121P, 277, 278 Inq; 331/94.5 Inq; 290/1; 166/302, 303

[56] References Cited
UNITED STATES PATENTS

| 956,058 | 4/1910 | Elten | 166/40 |
| 1,457,479 | 6/1923 | Wolcott | 166/39X |
| 2,134,610 | 10/1938 | Hogg | 166/60 |
| 2,670,801 | 3/1954 | Sherborne | 166/177X |
| 2,757,738 | 8/1956 | Ritchey | 166/60X |
| 2,923,535 | 2/1960 | Ljungstrom | 166/11X |
| 2,954,826 | 10/1960 | Sievers | 166/60 |
| 3,004,137 | 10/1961 | Karlovitz | 175/16X |
| 3,140,421 | 7/1964 | Spongberg | 219/121X |

*Primary Examiner*— Charles E. O'Connell
*Assistant Examiner*— Ian A. Calvert
*Attorney*— Strauch, Nolan, Neale, Nies and Kurz ABSTRACT: Gas and high frequency electrical generating plant equipment for field use in producing exhaust gas (carbon dioxide and nitrogen) which may be admixed, if desired, with gas or gases of differing energy levels, and high frequency electrical energy for an electromagnetic radio frequency transducer disposed in a natural hydrocarbon oil reservoir and arranged to impact the said gases and effect atomic and molecular interaction of the gases and electromagnetic waves with resultant emission of radiation in the infra-red sector of the electromagnetic spectrum into the natural reservoir to heat the oil bearing zone and the contained high viscosity hydrocarbon oil and reduce its viscosity level sufficiently to free and assure flow of the viscous hydrocarbon oil into a completed production well formed in the natural reservoir for recovery of the oil.

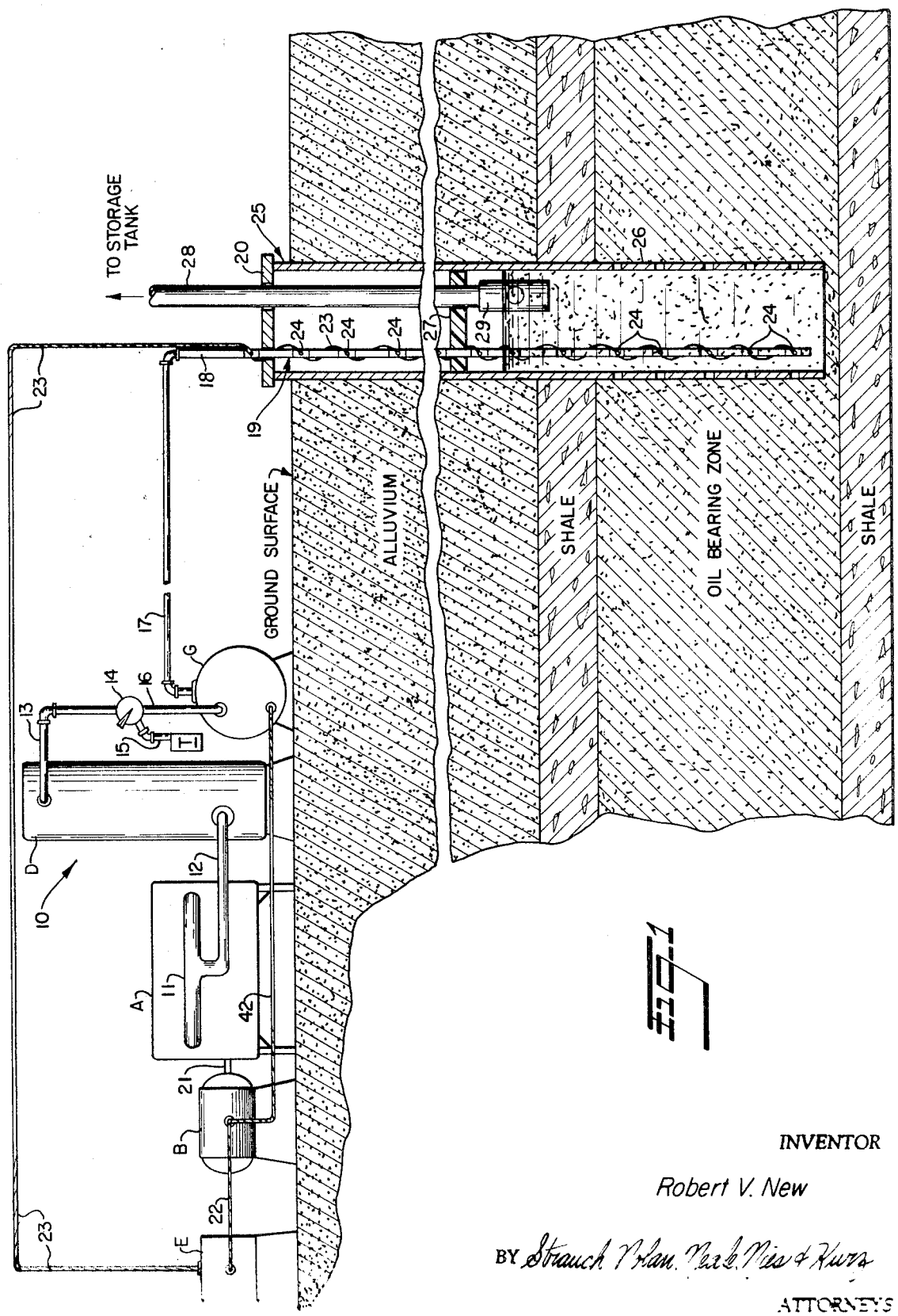

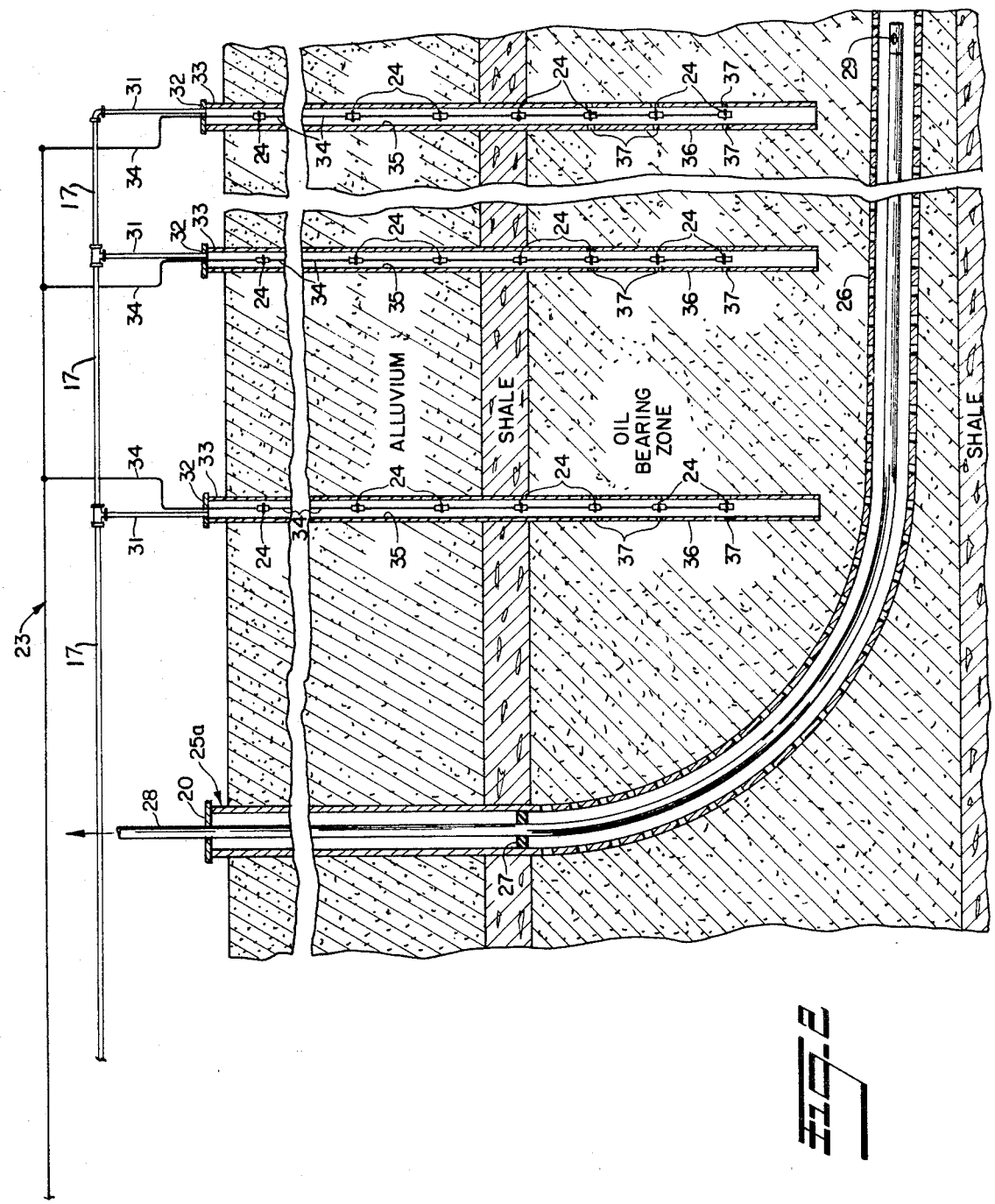

U.S. PATENT 3,522,848
APPARATUS FOR PRODUCTION AMPLIFICATION BY STIMULATED EMISSION OF RADIATION

BACKGROUND OF THE INVENTION

The subject invention concerns itself with new, novel, efficient and exceedingly economical generating plant equipment providing radio frequency electrical energy and an admix of carbon dioxide and nitrogen (and other gas or gases of differing energy levels) for interaction in a transducer to emit the heat of infra-red radiation into the porous and permeable oil bearing zone of natural reservoirs in the earth to cause the high viscosity hydrocarbon oil therein to materially reduce its viscosity so it will flow into a completed production well for recovery.

Viscous hydrocarbon oil usually occurs in natural reservoirs of porous and permeable conglomerate mass, the oil existing within the interstices of such matrix. The interstices vary in size and continuity as the size and shape of the solid formation particles of the matrix vary from reservoir to reservoir, indeed even from place to place within a single reservoir. Numerous fine fractures interlace the matrix, being interstices themselves. Viscous hydrocarbon oil is restricted in its flow from its position within such interstices because of the properties of cohesion which are the very essence of viscosity. At natural reservoir temperatures such oil is too thick and cohesive to flow through the openings of the matrix and thence into a drilled well to be produced.

It is well known in the petroleum sciences that heat reduces viscosity of hydrocarbon oil in spectacular fashion, that the application to high viscosity hydrocarbon oil of even a modest amount of heat can produce a reduction of viscosity that can approach 100/1 or even 1000/1.

SUMMARY OF THE INVENTION

My invention provides gas and electrical generator plant equipment for on site operation of an immensely improved and efficient means of producing and heating a viscous hydrocarbon reservoir by infra-red radiation arising from mixtures of certain gases herein set forth employing an internal combustion engine to transform natural ambient atmospheric air and volatile hydrocarbon fuel into carbon dioxide and nitrogen as an exhaust product while simultaneously driving an electrical generator to provide required quantities of high frequency (radio frequency) electrical energy to feedback into the exhaust gas (carbon dioxide and nitrogen) with other suitable gas for example, the noble gases helium, neon, argon, krypton and radon, at low pressure to cause excitation of such gas mixture and effect radiation emissions in the infra-red sector of the electromagnetic spectrum, within the cased well bore and adjacent reservoir interstices to heat and substantially reduce the viscosity of the viscous hydrocarbon oil in the natural reservoir.

An important object of my invention is to provide generating equipment that produces a combination of mechanical energy and large volumes of exhaust gas (carbon dioxide and nitrogen) for effective use under predetermined control to provide new, novel, efficient and extremely economical means to introduce heat into natural reservoirs containing highly viscous hydrocarbon oil.

Another object of my invention is to provide apparatus that is an assemblage of well known available and relatively inexpensive components arranged in an efficient and extremely economical combination for effective transformation of X quantities of volatile hydrocarbon fuel (and ambient atmospheric air) into 9 times X quantities of carbon dioxide and nitrogen exhaust (waste) gas, and by the same operation and at no additional cost simultaneously generate quantities of high frequency electrical energy (electromagnetic waves) to be a feedback into the exhaust gas, to produce infra-red radiation emissions by excitation of the gas mixture by electromagnetic wave impact as herein described.

A further important object of my invention is to provide as a part of the aforesaid apparatus an efficient, simple and economical transducer, comprising several joints of tubing connected by threaded couplings forming a continuous conduit for the gas mixture and an electrical cable spiralled thereabout mounting electrodes at pre-selected locations along the conduit, to exert radio frequency electromagnetic wave impacts upon the gas to cause ionization of the gas as it passes through said conduit for introduction in a completed production well having a portion at least in direct communication with the reservoir.

Still another important object of my invention is to provide an alternate transducer comprising a small diameter casing which both cases a bore hole drilled in a natural oil bearing reservoir and serves also as a conduit to introduce a selected gas mixture into the reservoir and to house an electrical cable suspended therein and mounting electrodes at pre-selected intervals arranged to exert radio frequency electromagnetic wave impacts upon the gas mixture to cause ionization thereof as the gas descends through the casing.

Another important object of my invention is to provide as a part of the aforesaid apparatus a compressor to receive the mixture of gases and impart to the mixture a sufficient but low pressure to cause the mixture to flow through one or the other of the aforementioned transducers and thence into a natural reservoir containing viscous hydrocarbon oil.

BRIEF DESCRIPTION OF THE DRAWINGS

Further objects of the invention will appear from the following description and appended claims when read in connection with the accompanying drawings wherein:

FIGURE 1 illustrates schematically the generator equipment of this invention, utilized for effective production of electrical energy and the principal gaseous component for practicing the invention of my copending application filed concurrently herewith, Serial No. 641,825, entitled "Method and Apparatus For Oil Production Amplification By Stimulated Emission of Radiation" through the instrumentality of a completed vertical production well; and FIGURE 2 illustrates schematically the generator equipment of FIGURE 1 of this invention modified to be utilized for practicing the invention of my aforesaid concurrently filed application through the instrumentality of a completed deviated production well.

DESCRIPTION OF PREFERRED EMBODIMENT OF THE INVENTION

With continued reference to the drawings wherein the same reference letters and numerals are employed throughout to indicate the same parts, the combined electrical and gas generating equipment 10 of this invention which can be successfully and conveniently assembled from a wide range of conventional apparatus components obtainable at low cost to efficiently and effectively produce and introduce gas at substantially elevated temperatures, and at relatively low pressure (as distinguished from high pressure gas-drive), into a natural oil bearing reservoir containing high viscosity hydrocarbon oil for the purpose of greatly reducing the viscosity thereof and imparting flowability to the oil content of such reservoir. FIGURE 1 illustrates a preferred adaptation of the invention wherein an internal combustion engine A of conventional construction, preferably of a type capable of burning a mixture of natural gas usually present in oil fields and ambient air, exhausts as products of combustion carbon dioxide and nitrogen, and water, all of which exhaust material is discharged normally through exhaust manifold 11, to an inlet pipe 12 of a desiccator D where all water is removed. The resulting dry carbon dioxide and nitrogen, still under the influence of exhaust pressure, passes from desiccator D through pipe 13 and mixing valve 14 where it may entrain if desired an optimum quantity of one or more of the noble gases stored in pressurized tank T connected to valve 14 through pipe 15.

Valve 14 is adjustably designed to admix the exhaust gas and noble gas additive in a ratio by volume to assure a predominate volume of carbon and nitrogen and, if desired, a sufficient amount only of noble gas to buffer the interaction and effect a considerable rise in temperature of the gas required by the determinable inherent characteristics of the reservoir. The mixture of such gases then passes from mixing valve 14 through pipe 16 to compressor G where it is compressed (to a relatively low pressure, for example of the order of 50 to 150 psi for reasons herein described) and delivered through pipe 17 to conduit 18 forming a part of a transducer 19 hereinafter described in detail.

The drive shaft 21 of engine A is connected to drive a suitable electrical generator B designed to generate electricity, preferably an A. C. generator for producing conventional 60 cycle current, which is conducted through cable 22 to a frequency converter E designed to convert the 60 cycle current to high frequency current in the radio range of frequencies. This high frequency current is fed into cable 23 which is coiled around conduit 18 as shown in FIGURE 1 and fitted at preselected intervals with a succession of electrodes 24 discharging into the gas mixture conveyed along conduit 18.

As shown in FIGURE 1, the transducer 19 is inserted through cap 20 of well casing 25 of a conventionally completed well in a natural oil bearing reservoir as schematically shown in FIGURE 1. Transducer 19 is made up of several joints of tubing connected by threaded couplings to form conduit 18 for conveying the gas mixture from compressor G into the oil bearing zone. Electrical cable 23 supplies the high frequency current to electrodes 24, the discharge of which impacts upon the gas as it passes through transducer conduit 18 causing electromagnetic interaction with the atoms and molecules of the gas and resultant exuding of the greatly heated gas into the formation and the viscous oil contained therein through the perforated casing portion 26 of the borehole casing 25 below packer 27 mounting production tubing 28 which conveys oil from pump 29 located below packer 27 to the surface in conventional manner.

The greatly heated gas emits infra-red radiation which raises the temperature of the viscous hydrocarbon oil and the oil bearing zone in the manner disclosed in my aforementioned copending concurrently filed application.

The operation of the generating equipment 10 and the results obtainable therefrom, are based upon proven scientific theories, i.e.:

1. Internal combustion engines will produce 9X quantities of $CO_2$ and $N_2$ for each X quantity of natural gas burned as fuel, and will at the same time drive an A. C. generator to produce quantities of 60 cycle electrical energy at no extra cost for use after conversion to high frequency (radio frequency) electrical energy as a feedback into the gas for ionization thereof.
2. The electrical energy so generated can be converted to radio frequencies by available frequency converters in known manner.
3. The $CO_2$ and $N_2$ content of the exhaust of an internal combustion engine needs only as treatment for the purposes of this invention the drying provided by a conventional type desiccator; experience indicates that at pressures below 225 pounds square inch $CO_2$ and $N_2$ causes little or no corrosion of materials. In this connection it should be kept thoroughly in mind that this invention is clearly set forth as one to "heat', as distinguished from a high pressure "gas-drive" or forced displacement theory. In this invention, operating at relatively low pressures, the hot gas moves slowly into the reservoir so the element of time complements the co-efficient of heat transfer and, having reduced viscosity by heat, then makes the matrix and hydrocarbon particles "gas wet".

DESCRIPTION OF ALTERNATE APPLICATION OF THE INVENTION

The combined electrical and gas generating equipment 10 of FIGURE 1 can also be employed to furnish high frequency electrical energy and gas to effect recovery of high viscosity oil from a reservoir through a conventionally completed directionally deviated well employing a well casing 25a the deviated perforated portion 26 which extends nearly horizontally along the lower area of the reservoir as schematically shown in FIGURE 2. In this application, the generating equipment 10 as described in connection with FIGURE 1 is above ground and identical to that of FIGURE 1 and the production well fittings of FIGURE 2 corresponding to those of FIGURE 1 have been given the same reference numerals as in FIGURE 1. Instead of encircling the conduit 18 with high frequency cable 23 to form a transducer 19 for disposition in the completed well casing as in FIGURE 1, the pipe 17 is connected to a series of branch gas supply conduits 31 of predetermined number extended through caps 32 of respective small diameter (for example 2 1/2 inch) bore-hole casings 33 of equal number and cable 23 is connected to branch high frequency feeder lines 34 of equal number which are passed through the respective caps 32 to depend therefrom within the respective bore-hole casings 33 as shown in FIGURE 2. At predetermined intervals along the depending lengths of feeder lines 34 electrodes 24 are connected to effect high frequency electromagnetic impacts into the gas mixture supplied to the interior of the respective bore-hole casings 33 by branch gas supply conduits 31.

In this application of the invention, a series of small diameter bore-holes 35 are drilled into the natural reservoir in longitudinally spaced relation at opposite sides of the horizontal run of the perforated section 26 of the production well casing 25a, the number and spacing of the series of bore-holes 35 being chosen to assure uniform heating of the oil bearing zone and contained viscous hydrocarbon oil therein to a predetermined temperature calculated to reduce the viscosity of the hydrocarbon oil sufficiently to assure gravity flow of the hydrocarbon oil as pointed out in my aforesaid copending application into the perforated section 26 of the recovery well for production in the usual manner. To assure that the excited gases emitting infra-red radiation are suitably distributed throughout the oil bearing zone, the portion 36 of the small diameter bore-casings 33 penetrating the oil bearing zone are perforated at one or more places as shown at 37, preferably in radial alignment with each electrode 24 as shown in FIGURE 2.

In both applications of the invention a unified threefold advantage results in that (1) the temperature of the viscous hydrocarbon oil in a natural oil bearing reservoir is elevated to a sufficient degree throughout the reservoir, (2) the heat is more efficiently produced than any heretofore practiced method, and (3) heating is accomplished more cheaply than in any heretofore practiced method.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Radiation generating equipment for amplifying the flow of oil in producing a natural reservoir comprising an internal combustion engine exhausting as principal gaseous components carbon dioxide and nitrogen, said engine having a power output shaft; means for drying said engine exhaust gas, and conducting the resulting dried exhaust gas into said natural reservoir at a predetermined low pressure; high frequency electrical generating equipment including a generator drivingly connected to said engine power output shaft and a frequency converter connected to the electrical output of said generator to produce radio frequency output current; and conductor means including electrode means for discharging said radio frequency output current as ionizing electron impacts into the resultant dried exhaust gases as they are conducted into said natural reservoir to excite the gases by effecting an interaction between the electromagnetic waves and the atoms and molecules of the gas causing an appreciable temperature rise in the gas and a resultant emission of infra-red radiation into the oil bearing area of said natural reservoir as a result of the heated gas entering the reservoir thereby heating the reservoir area to a temperature sufficiently high to reduce the viscosity of the contained oil and free it to flow to a subsurface collection point.

2. The apparatus of claim 1 wherein said means for drying said engine exhaust and conducting the resultant dried exhaust gas includes tubing adapted to be suspended within the casing of a conventionally completed well and said electrode means comprises a length of cable carried by said tubing from end-to-end and fitted at preselected intervals with electrodes extending into said tubing to discharge into the conducted resultant mixture of gases.

3. The apparatus of Claim 1, wherein said means for drying said engine exhaust and conducting the resultant dried exhaust gas includes small diameter bore hole casing extending into said natural reservoir and having a perforated portion extending into the oil bearing area of said natural reservoir and said electrode means comprises a length of cable coextensive in length to said small diameter bore hole casing suspended in said casing and fitted at preselected intervals with electrodes to discharge into the conducted resultant mixture of gases.

4. The apparatus of Claim 3 wherein at least certain of said perforations in the perforated portion of said bore hole casing are disposed in radial outward relation to said electrodes.

5. Gas and electrical generating equipment for field use in generating a gas and high frequency electrical energy for use in operating an electromagnetic transducer comprising an internal combustion engine having an output shaft and exhaust manifold; an electrical generator drivingly connected to said output shaft to output a source of conventional low frequency electrical energy; a frequency converter connected to the output source of low frequency electrical energy to output a source of high frequency electrical energy of radio frequency and having an output cable to conduct the high frequency electrical energy to a point of use; a desiccator connected to said exhaust manifold for drying the gaseous exhaust products of combustion; a source of gas of differing energy level under pressure; a mixing valve connected to said desiccator to receive the dried gaseous exhaust products of combustion and to said source of differing energy level gas and adjustable to admix preselected amounts of said differing energy level gas with said dried gaseous exhaust products of combustion and discharge the admixed gases; a compressor connected to the discharge of said mixing valve to receive and compress said admixed gases to a predetermined low pressure and having an outlet and conduit means connected to said outlet to conduct the pressurized admixed gases to said point of use.

6. Gas and electrical generating equipment for field use in generating a gas and high frequency electrical energy for use in operating an electromagnetic transducer comprising an internal combustion engine having an output shaft and exhaust manifold; an electrical generator drivingly connected to said output shaft to output a source of conventional low frequency electrical energy; a frequency converter connected to the output source of low frequency electrical energy to output a source of high frequency electrical energy of radio frequency and having an output cable fitted with electrodes to discharge the high frequency electrical energy; a desiccator connected to said exhaust manifold for drying the gaseous exhaust products of combustion; a source of differing energy level gas under pressure; a mixing valve connected to said desiccator to receive the dried gaseous exhaust products of combustion and to said source of said differing energy level gas and adjustable to admix predetermined amounts of said differing energy level gas with said dried gaseous exhaust products of combustion and discharge the admixed gases; a compressor connected to the discharge of said mixing valve to receive and compress said admixed gases to a predetermined low pressure and having an outlet; and conduit means connected to said outlet to conduct the pressurized admixed gases to a gas conduit disposed within a bore hole in a natural oil bearing reservoir, to introduce said mixture of gases into the interstices of said reservoir, said electrodes being arranged to discharge into and impact and ionize the gases in said gas conduit and effect infra-red radiation emissions for heating said gases and the viscous oil in said reservoir.

UNITED STATES PATENT OFFICE
CERTIFICATE OF CORRECTION

Patent No. 3,522,848      Dated August 4, 1970

Inventor(s) Robert V. New
APPARATUS FOR PRODUCTION AMPLIFICATION BY STIMULATED EMISSION OF RADIATION It is certified that error appears in the above-identified patent and that said Letters Patent are hereby corrected as shown below:

Column 3, line 3, after "carbon" insert -- dioxide --.

Column 3, line 68, "heat' should be -- "heat" --.

Column 4, line 9, after "26" insert -- of --.

SIGNED AND
SEALED
OCT 27 1970

(SEAL)
Attest:

Edward M. Fletcher, Jr.
Attesting Officer

WILLIAM E. SCHUYLER, JR.
Commissioner of Patents